May 13, 1930.  E. S. MAINE  1,758,527
POWER DRIVE ATTACHMENT
Filed Jan. 17, 1924  2 Sheets-Sheet 1

ELMER S. MAINE
INVENTOR
George J. Haight
atty.

May 13, 1930.  E. S. MAINE  1,758,527
POWER DRIVE ATTACHMENT
Filed Jan. 17, 1924   2 Sheets-Sheet 2

ELMER S. MAINE
INVENTOR

George J. Haight
Atty.

Patented May 13, 1930

1,758,527

UNITED STATES PATENT OFFICE

ELMER S. MAINE, OF CHICAGO, ILLINOIS

POWER DRIVE ATTACHMENT

Application filed January 17, 1924. Serial No. 686,775.

This invention relates to a power driven sickle bar and has for its primary object a construction of a mechanism that will efficiently operate a sickle bar from the motor of a tractor.

An object of the invention is to provide an attachment for tractors whereby one or more farm machines may be driven direct from the motor of a tractor at the same speed or different speed than the travel of the tractor.

Another object of the invention is to simplify the transmission structure so as to prolong the life thereof and further prevent the clashing of gears at the change of speed.

Other objects and advantages of the invention will more clearly appear from the description and claims hereinafter following.

In the drawings forming a part of this specification, Fig. 1 is a side elevation of my drive mechanism in applied position, the tractor being shown in a diagrammatic manner.

Figure 1:
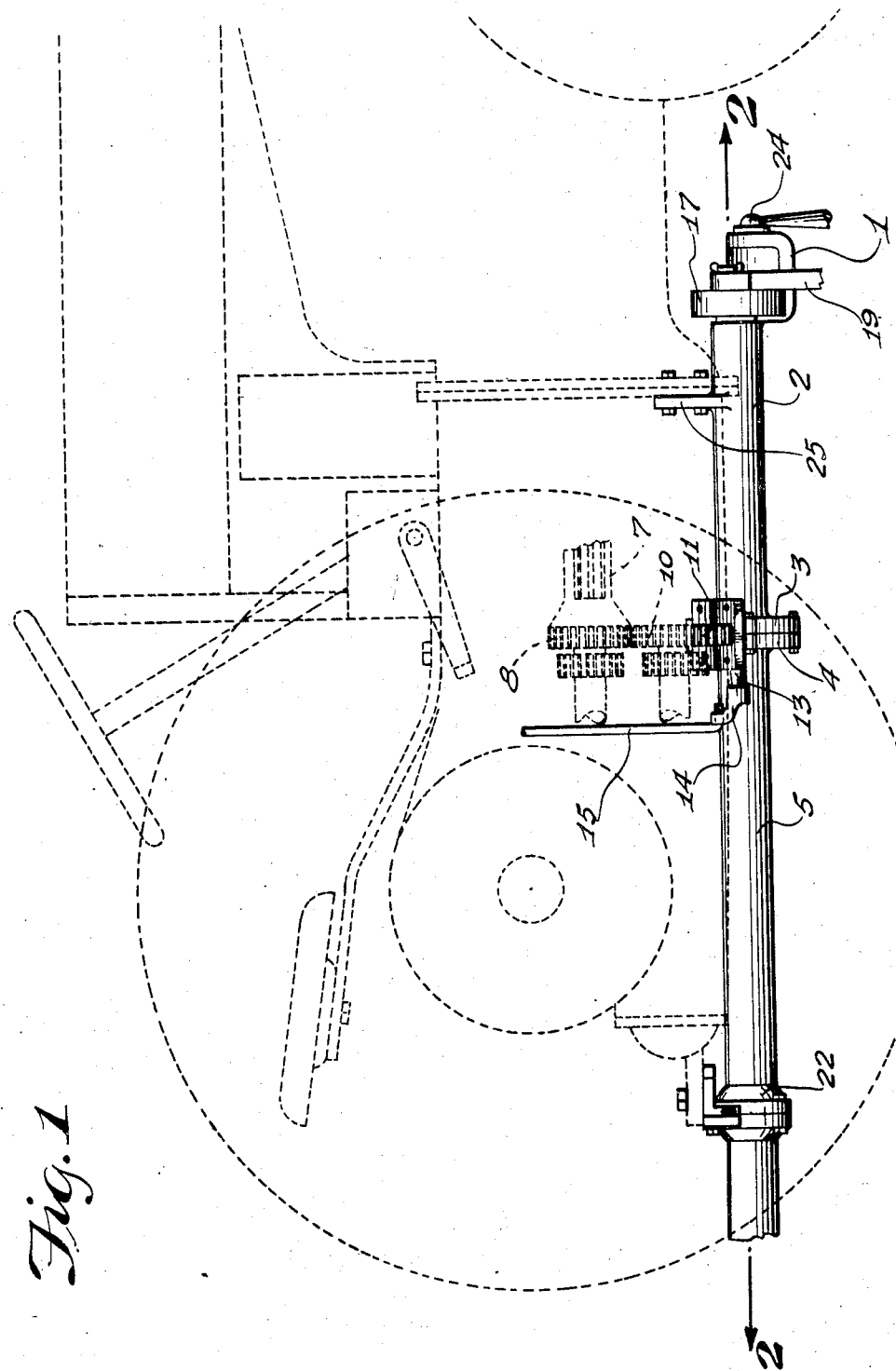
Figures 2, 3:
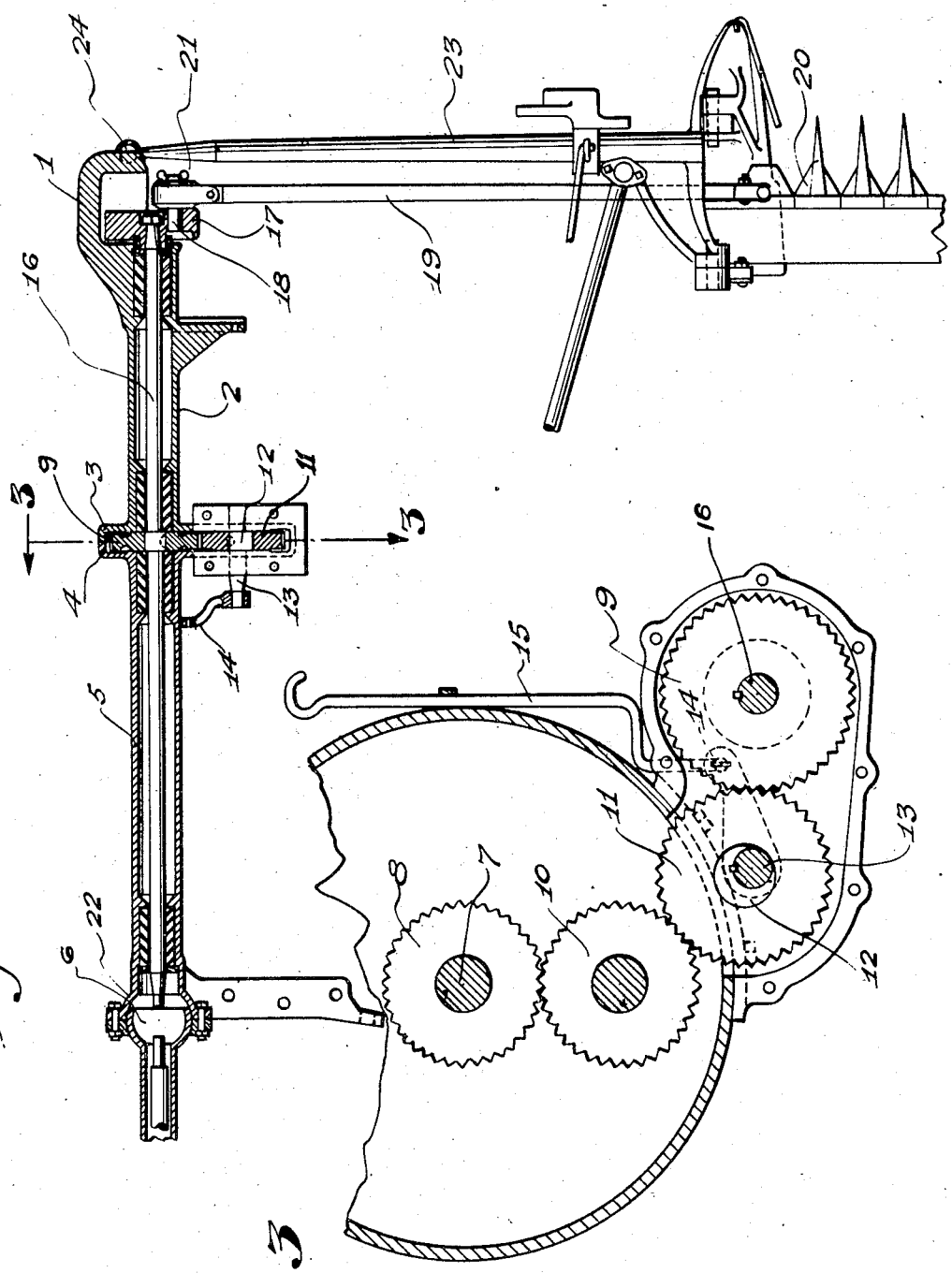
Fig. 2 is a horizontal sectional view, corresponding substantially to the line 2—2 of Fig. 1.
Fig. 3 is a cross sectional view partly broken away of a portion of a tractor corresponding substantially to the line 3—3 of Fig. 2.

In said drawings 1 designates a housing from which projects the tubular extension 2 that has its free end formed into one section 3 of a gear casing, while the other section 4 of this gear casing is formed upon the end of a tube 5 which carries at its other end a coupling 6.

The tractor is provided with the usual drive shaft 7 having a drive gear 8 mounted thereon adapted to drive a gear 9 through the intermediate gears 10 and 11. The intermediate gear 11 is mounted on an eccentric 12 which in turn is keyed to a stub shaft 13. It will be evident that when the stub shaft 13 is partially rotated the action of the eccentric 12 will bring gear 11 into mesh with the gears 9 and 10. By this arrangement an easy action will be effected, thereby reducing the danger of clashing and preventing unnecessary strain.

The stub shaft 13 is connected to an arm 14 adapted to be rocked by the control rod 15, the rod 15 being extended upwardly to a point within convenient reach of the operator of the tractor. The driven gear 9 is fixed to an operating shaft 16 housed within the tube 5 and the tubular extension. To the outer end of the shaft 16 is fixed a crank disk 17 provided with the usual crank pin 18, to which is connected a pitman 19 of the sickle 20. The pitman 19 is detachably held on the pin 18 by a thumb nut 21 so that the pitman may be readily disconnected from the disk when found necessary. The other end of the shaft 16 is connected by any suitable means, such as a universal joint 22, with the operating shaft of a farm machine coupled to the rear of the tractor.

The sickle 20 is supported by a rod 23 having a ball and socket connection 24 with the housing 1 so that the sickle structure may be elevated at a required angle.

It will be noted that the various parts are so arranged that the sickle may be operated simultaneously with the binder also having a drive connection with the operating shaft 16.

It is, of course, to be understood that the farm machine connected at the rear of the tractor and pivotally connected to the shaft 16 may be driven independent of the sickle by disconnecting the sickle in any suitable manner such as detaching the pitman from the pivot bolt 18.

It will also be noted that the apparatus is attached to the tractor as a unit through the attaching elements 25 and thus ready access may be had to the parts when necessary, and the units attached to tractors in use without any radical changes.

While I have herein shown and described what I now consider the preferred manner of carrying out my invention, the same is merely illustrative, and I contemplate all changes and modifications that come within the scope of the claims appended hereto.

Having thus described my invention what I claim is:—

1. The combination with a tractor, including a power means, of driving connections for said tractor, including a longitudinally extending propeller shaft operable by the power means; operating mechanism supported by the tractor, and including an elongated tube having a shaft rotatably mounted therein and supported thereby; and power transmission mechanism including a gear affixed directly to the propeller shaft, an idler gear meshing therewith, a gear for driving said shaft, said gear being arranged intermediate the ends of the shaft in said tube, and a radially shiftable gear adapted to be thrown into and out of mesh with said two last named gears to effect operation of the shaft in said tube.

2. The combination with a tractor, including power means and change speed gear mechanism; of a longitudinally extending propeller shaft connected with said power means for driving said tractor; an attachment secured to said tractor and including an elongated support mounted at one side of said tractor and extending substantially parallel with the longitudinal axis of said tractor, said support being provided with a lateral extension adapted to carry an operating part, and provided with spaced bearings; a longitudinally extending shaft rotatably carried by said support in said spaced bearing and having means providing a crank and pitman adapted to be connected with said operating part; means for driving said shaft from said power means including a driven gear connected to said longitudinal shaft and a driving gear operatively connected with said propeller shaft, said gears being spaced apart, and another gear mounted upon an eccentric carried by said support and radially movable to enable the same to be brought simultaneously into and out of mesh with said driving and driven gears; and controlling means adapted to be operated from the seat of the tractor for shifting said radially movable gear into and out of mesh with the co-operating driving and driven gears.

In witness whereof, I hereunto subscribe my name.

ELMER S. MAINE.